Nov. 22, 1932.  E. A. JOHNSTON  1,888,505

COTTON PICKER

Filed Feb. 1, 1929

Inventor
Edward A. Johnston
By H. P. Daniels
Atty.

Patented Nov. 22, 1932

1,888,505

UNITED STATES PATENT OFFICE

EDWARD A. JOHNSTON, OF CHICAGO, ILLINOIS, ASSIGNOR TO INTERNATIONAL HARVESTER COMPANY, A CORPORATION OF NEW JERSEY

COTTON PICKER

Application filed February 1, 1929. Serial No. 336,885.

The present invention is in cotton harvesting machinery of the spindle type and relates more particularly to the manner of mounting the spindles and the character of movement given them during operation.

The principal object of the invention is to mount and actuate the individual spindles of a spindle type cotton picker so as to cause the effective end of the spindle to travel in a generally circular or elliptical path as it is introduced into and withdrawn from the plant row during travel of the machine, as distinguished from the rectilinear reciprocation heretofore employed in reciprocating spindle machines.

A further object is to arrange and actuate the spindles so as to cause them to be presented to the row of cotton plants at gradually changing angles with respect to the line of travel of the harvester, thereby favoring contact with all the open bolls carried by the plants.

Figure 1:
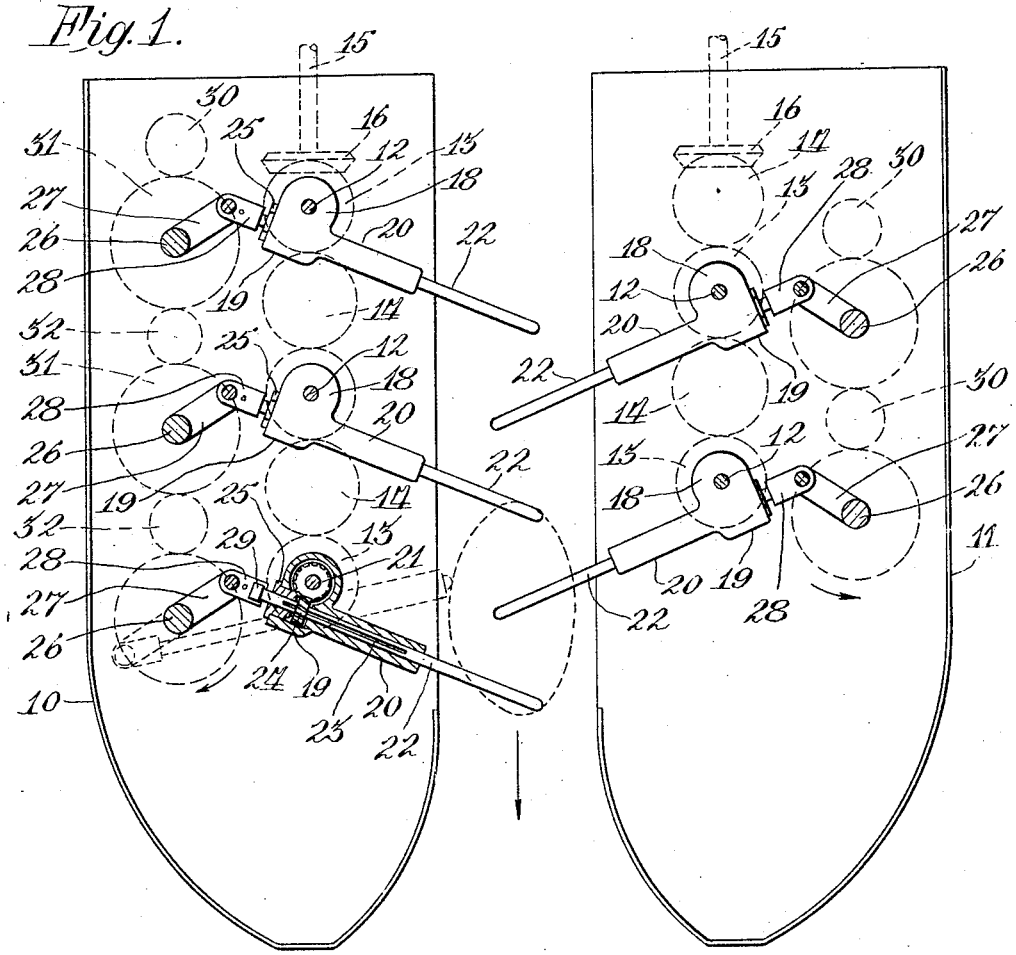
Figure 2:
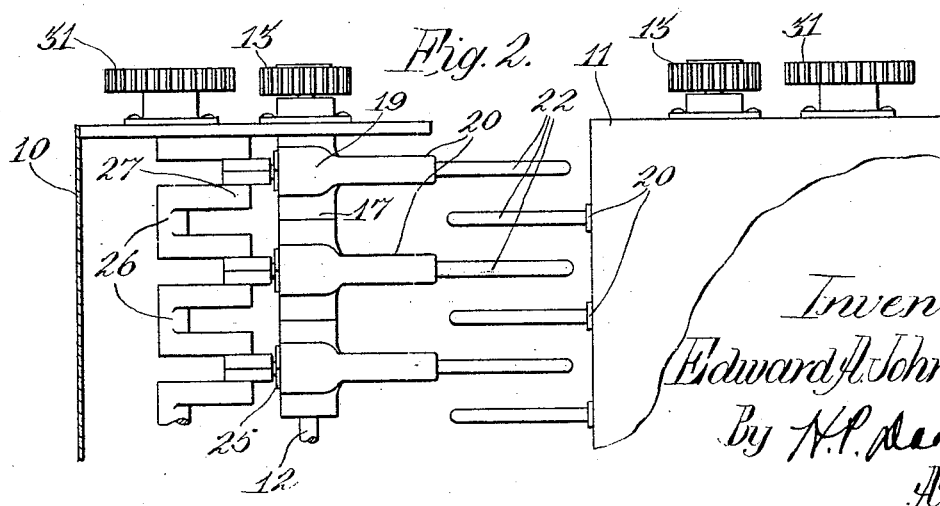

The foregoing improvements in manner of operation as well as other structural improvements and advantages reside in the organization and details of construction hereinafter described and claimed and illustrated in the accompanying sheet of drawing, where:

Figure 1 is a view from above of a portion of the spindle carrying mechanism of a cotton harvester embodying the invention; and, Figure 2 is a partial front elevation of the same.

In the present disclosure, the invention is illustrated as embodied in a harvesting machine having side housings 10 and 11 which are positioned at each side of the machine and spaced so as to flank opposite sides of the plant row as the machine travels along the same. The position and construction of the housings and the manner in which they may be suspended from the carrying frame of the harvester involves nothing novel, and further description thereof is unnecessary.

In the practice of the present invention a suitable number of vertical shafts 12 are mounted in each housing so as to be in alignment in longitudinal planes with respect to the line of travel but with the shafts in the respective housings in offset transverse planes, as will be understood from Figure 1. Each of the shafts has fixed thereto at its upper end a driving gear 13, and the shafts are connected so as to rotate at even speed by intermediate gears 14 suitably mounted in the housing. A power transmitting shaft 15 having a bevel gear 16 transmits power to the rearmost shaft of each series. Each shaft 12 has rockably mounted on it a vertical series of spindle carrying elements or housings 17, as shown in Figure 2. Each of these housings is formed with a generally cylindrical body portion 18 journaled on the shaft 12 and with a lateral, cylindrical bearing portion 19 having its axis at right angles to the axis of the shaft 12. At one end the bearing portion 19 has an integral, tubular extension 20 of reduced external diameter. The body 18 of the spindle carrying housing 17 serves to enclose a worm drive pinion 21 fixed on shaft 12. The bearing portion 19 and tubular extension 20 carry or form the bearing for a picker spindle 22. This spindle is mounted between its ends in a carrier, as clearly shown in Figure 1, with its effective end at the tubular extension 20. The spindle is mounted for reciprocation and rotation in the carrier and, in order that it may be reciprocated while being rotated, the spindle is formed with a spline groove 23 and carries a worm pinion 24 which is located in the bearing portion 19 of the carrier and is provided with a key slidable in the spline groove 23. The pinion 24 is in mesh with and driven by the worm drive pinion 21. An end plug or bushing 25 is threaded in the enlarged end portion of the bearing housing 19 and abuts the pinion 24 to retain it in position. At the rear of each of the shafts 12 there is journaled in the housing a series of vertical crank shafts 26. These shafts are slightly offset from the transverse planes of the shafts 12 so as to lie substantially in the same transverse planes as the axes of the spindles when these are fully extended and at right angles to the line of travel. The crank shafts are formed with a series of vertically superposed cranks 27 corresponding in position to the vertically arranged spindle carrying housings, and each crank has journaled on it a swivel head 28 in which an enlarged end 29 on the spindle 22 is swiveled.

The crank shafts 26 are driven at even speed in any suitable manner and at comparatively slow speed, as, for instance, by a drive pinion 30, driven gears 31 on each shaft, and intermediate idler pinions 32. In the preferred arrangement of the picker spindles in the respective housings the horizontal rows of spindles are in alternate horizontal planes, as shown in Figure 2.

With the construction and arrangement above described, it will be understood that rotation of a crank shaft 26 will effect reciprocation of the spindle 22, moving it in the manner indicated in dotted lines on Figure 1 and causing its effective end to describe the elliptical path indicated. As the direction of travel is that indicated by the arrow in Figure 1, the spindle will be projected into the row at a forwardly directed angle, as shown in the full lines of the drawing, and will be gradually moved rearwardly at changing angles, and finally withdrawn into the tubular extension 20 until it attains the position shown in dotted lines. The withdrawal of the spindle into the tubular extension 20 effects stripping of the gathered cotton from the spindle, as will be readily understood. As the spindle is reciprocated by rotation of the crank 27, the spindle carrier or housing 17 will necessarily be rocked on shaft 12, and reciprocation and rocking movements will in no way interfere with the constant rotation of the spindle.

The above construction, which has been described as the preferred embodiment of the invention, characterizes a picker organization in which the individual pickers are given an elliptical sweeping movement in a horizontal plane during reciprocatiton and in which the arrangement of pickers is such that substantially all parts of the space between the housings occupied by a plant row will be subjected to the action of the pickers during a cycle of movement thereof. The scope of the invention is defined in the following claims.

What is claimed is:

1. In a cotton harvester, a picker assembly comprising a drive shaft, a spindle housing rockably mounted on the drive shaft and formed with a bearing portion at one side in angular relation to the drive shaft, a spindle rotatively and reciprocably journaled between its ends in said bearing portion, a driving pinion on the shaft within the housing, a driven pinion splined on the spindle within the bearing portion of the housing and in engagement with the driving pinion, and a driving element rotating on an axis perpendicular to the axis of the spindle and connected to one end of the spindle eccentrically to the axis of said driving element.

2. In a cotton harvester, a picker assembly comprising a drive shaft, a spindle housing rockably mounted on the drive shaft and formed with a bearing portion at one side in angular relation to the drive shaft, said bearing portion being axially extended at one end, a spindle rotatively and reciprocably journaled between its ends in said bearing portion with its effective end projectable from the extended portion thereof, means for rotating the spindle by said drive shaft, and a driving element rotating on an axis perpendicular to the axis of the spindle and connected to the other end of the spindle eccentrically to the axis of said driving element, the effective end of the spindle being drawn into the extension of the bearing portion at each reciprocation imparted thereto by rotation of the driving element.

3. In a cotton harvester, the combination of a pair of spaced supports adapted to flank opposite sides of a plant row, a vertical shaft carried by each support with the respective shafts in offset transverse planes, a series of vertically spaced horizontally extending spindle bearing sleeves rockably mounted on each shaft with the bearing sleeves on the respective shafts in alternate horizontal planes, spindles rotatably and reciprocably mounted between their ends in said bearing sleeves, means for rotating the spindles, and means for rocking the sleeves and reciprocating the spindles therein during rotation.

In testimony whereof I affix my signature.

EDWARD A. JOHNSTON.